US012463383B2

(12) United States Patent
Lv et al.

(10) Patent No.: US 12,463,383 B2
(45) Date of Patent: Nov. 4, 2025

(54) ELECTRICAL CONNECTOR WITH REINFORCING MEMBERS

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventors: Lai-Hang Lv, Kunshan (CN); De-Jin Chen, Kunshan (CN)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 421 days.

(21) Appl. No.: 17/989,200

(22) Filed: Nov. 17, 2022

(65) Prior Publication Data

US 2023/0163529 A1 May 25, 2023

(30) Foreign Application Priority Data

Nov. 24, 2021 (CN) ......................... 202122894325.7

(51) Int. Cl.

| | |
|---|---|
| ***H01R 13/658*** | (2011.01) |
| ***H01R 12/71*** | (2011.01) |
| ***H01R 12/72*** | (2011.01) |
| ***H01R 13/6581*** | (2011.01) |

(52) U.S. Cl.

CPC ....... *H01R 13/6581* (2013.01); *H01R 12/716* (2013.01); *H01R 12/721* (2013.01)

(58) Field of Classification Search

CPC . H01R 13/6581; H01R 12/716; H01R 12/721
USPC ..................................................... 439/607.31
See application file for complete search history.

(56) References Cited

U.S. PATENT DOCUMENTS

| | | | | |
|---|---|---|---|---|
| 5,112,242 A * | 5/1992 | Choy | H01R 12/7005 | 439/328 |
| 5,211,568 A * | 5/1993 | Yamada | H01R 13/633 | 439/153 |
| 5,573,408 A * | 11/1996 | Laub | H01R 12/721 | 439/876 |

(Continued)

FOREIGN PATENT DOCUMENTS

| | | | |
|---|---|---|---|
| CN | 209571614 U * | 11/2019 | H01R 12/716 |
| JP | 2015122189 A * | 7/2015 | |
| JP | 2019036500 A * | 3/2019 | H01R 12/55 |

*Primary Examiner* — Peter G Leigh
(74) *Attorney, Agent, or Firm* — Ming Chieh Chang

(57) ABSTRACT

An electrical connector includes: an insulative housing comprising two side walls extending along a longitudinal direction thereof and two end walls connecting with the two side walls to together define a mating slot; plural conductive terminals arranged on the side walls and having contacting portions protruding into the mating slot; a metallic shell surrounding the insulative housing and having two side plates covering the side walls and two end plates covering the end walls; and a pair of reinforcing members retained in the end walls, respectively, wherein the end wall defines a recess accommodating the reinforcing member, an inside of the reinforcing member directly faces the mating slot, and an outside of the reinforcing member is attached with the end plate.

12 Claims, 6 Drawing Sheets

(56) References Cited

U.S. PATENT DOCUMENTS

| | | | | | |
|---|---|---|---|---|---|
| 5,697,799 | A * | 12/1997 | Consoli | H01R 12/73 | 439/910 |
| 7,699,644 | B2 * | 4/2010 | Szczesny | H01R 12/7005 | 439/377 |
| 8,348,701 | B1 * | 1/2013 | Lan | H01R 12/716 | 439/607.19 |
| 11,245,208 | B2 | 2/2022 | Liu et al. | | |
| 11,381,015 | B2 | 7/2022 | Lu | | |
| 2003/0100211 | A1 * | 5/2003 | Wu | H01R 12/707 | 439/328 |
| 2007/0155245 | A1 * | 7/2007 | Tsai | H01R 12/7005 | 439/637 |
| 2009/0088003 | A1 * | 4/2009 | Szczesny | H01R 12/7005 | 439/62 |
| 2015/0140840 | A1 * | 5/2015 | Nishimura | H01R 12/775 | 439/74 |
| 2016/0336667 | A1 * | 11/2016 | Kee Mew | H01R 12/7005 | |
| 2018/0212362 | A1 * | 7/2018 | Wang | H01R 33/97 | |
| 2019/0173232 | A1 * | 6/2019 | Lu | H01R 13/6594 | |
| 2020/0106217 | A1 * | 4/2020 | Liu | H01R 13/26 | |
| 2020/0203867 | A1 * | 6/2020 | Lu | H01R 12/716 | |
| 2020/0274269 | A1 * | 8/2020 | Teh | H01R 12/7005 | |
| 2020/0335890 | A1 * | 10/2020 | Liu | H01R 12/7064 | |

* cited by examiner

ELECTRICAL CONNECTOR WITH REINFORCING MEMBERS

BACKGROUND OF THE INVENTION

Field of the Invention

The present invention relates to an electrical connector.

Description of Related Arts

U.S. Pat. No. 11,245,208 discloses an electrical connector which includes an insulative housing with a card slot, a plurality of conductive terminals retained in the housing, and two metallic guiding members retained at opposite insides of the two opposite end walls for guiding a complementary card. The end walls and the metallic guiding members increase an entire length of the electrical connector.

U.S. Pat. No. 11,381,015 discloses a conductive shell enclosing an insulative housing and having a pair of integral tabs located at end walls of the insulative housing.

SUMMARY OF THE INVENTION

An electrical connector comprises: an insulative housing comprising two side walls extending along a longitudinal direction thereof and two end walls connecting with the two side walls to together define a mating slot; a plurality of conductive terminals arranged on the side walls and comprising contacting portions protruding into the mating slot; a metallic shell surrounding the insulative housing and comprising two side plates covering the side walls and two end plates covering the end walls; and a pair of reinforcing members retained in the end walls, respectively, wherein the end wall defines a recess accommodating the reinforcing member, an inside of the reinforcing member directly faces the mating slot, and an outside of the reinforcing member is attached with the end plate.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
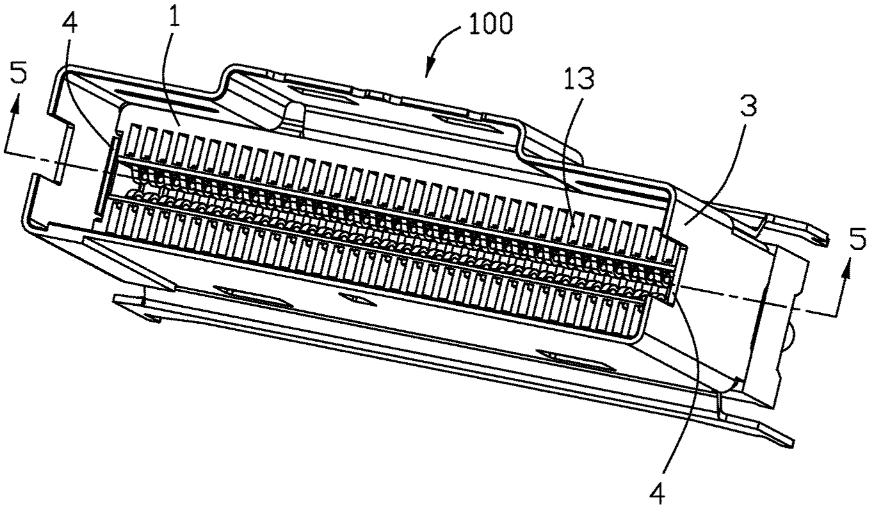
FIG. 1 is a perspective view of an electrical connector of an embodiment of the present invention.
Figure 2:
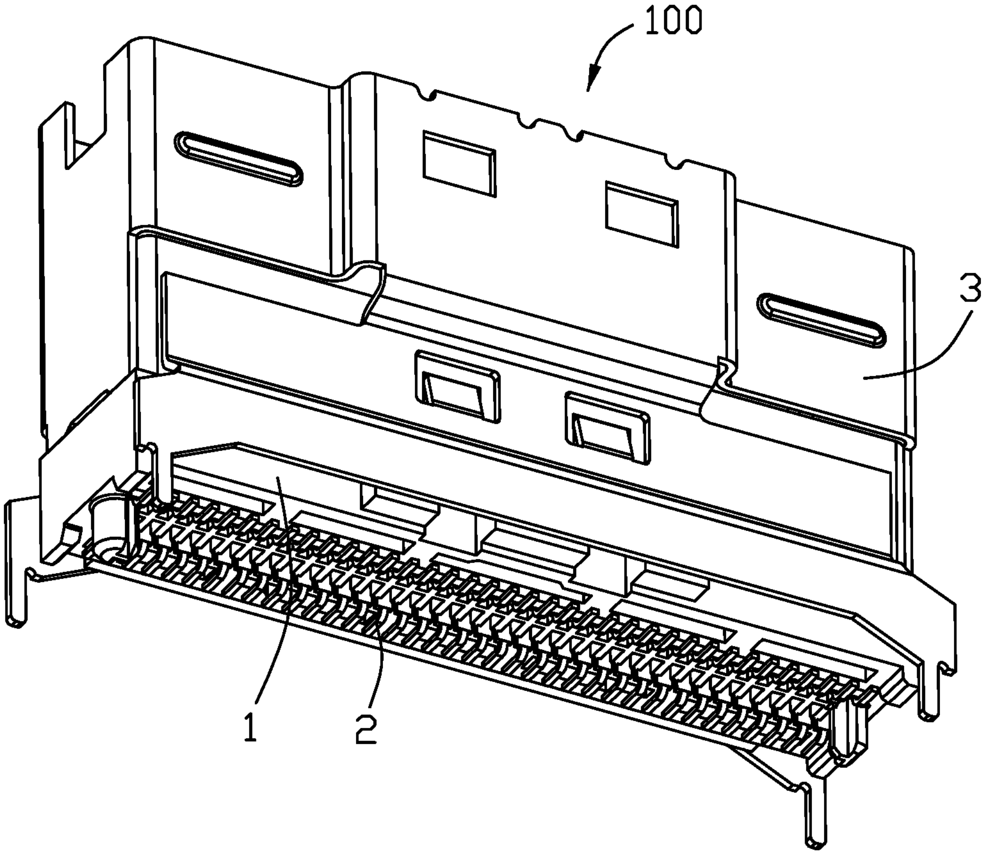
FIG. 2 is another perspective view of the electrical connector of FIG. 1.

Reference will now be made in detail to the preferred embodiments of the present invention.

Referring to FIGS. 1-4 illustrating an electrical connector 100, the electrical connector 100 comprises an insulative housing 1 made from insulating material, a plurality of conductive terminals 2, a metallic shell 3 and a pair of reinforcing members 4. The insulative housing 1 has two side walls 11 extending along a longitudinal direction and two end walls 12 connecting with the two side walls 11, commonly defining a mating slot 13 surrounded by the side walls 11 and the end walls 12. The plurality of terminals 2 are arranged on the side walls 11 and comprise contacting portions 21 protruding into the mating slot 13. The metallic shell 3 surrounds the insulative housing 1 and comprises two side plates 31 covering two side walls 11 and two end plates 32 covering the end walls 12. The end wall 12 comprises a recess 14 extending in an upper-lower direction and a transverse direction perpendicular to the upper-lower direction and the longitudinal direction. The recess 14 connects with the mating slot 13 in the longitudinal direction. The reinforcing member 4 is accommodated and retained in corresponding recess 14. An inside of the reinforcing member 4 directly faces the mating slot 13, an outside of the reinforcing member 4 is attached with an inside of the end plate 32 of the metallic shell 3. When the mating slot 13 of the electrical connector 100 is plugged with a mating connector, the mating connector is guided by the reinforcing member 4 firstly and then interfered with the reinforcing member 4, avoid interference with the end walls 12. Therefore, insulative housing 1, especially the end walls 12 are prevented from destroying in a condition of an oblique insertion or a mis-insertion of the mating connector happens. Since the reinforcing members 4 are arranged in the end walls 12, a length in the longitudinal direction of the electrical connector 10 will not be increased additionally, which is beneficial to miniaturization of the electrical connector 100.

Figure 3:
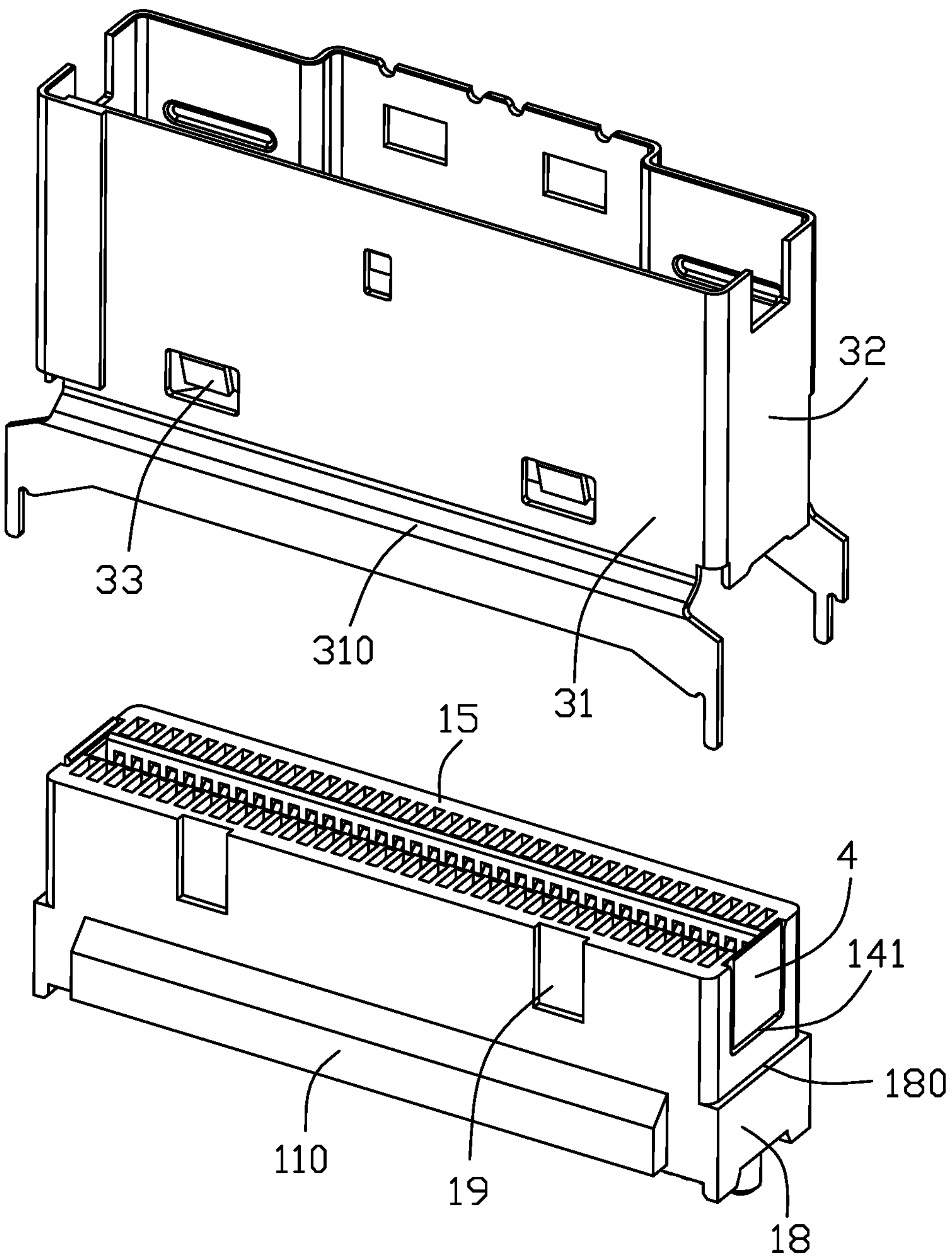
FIG. 3 is an exploded perspective view of the electrical connector of FIG. 1.
Figure 4:
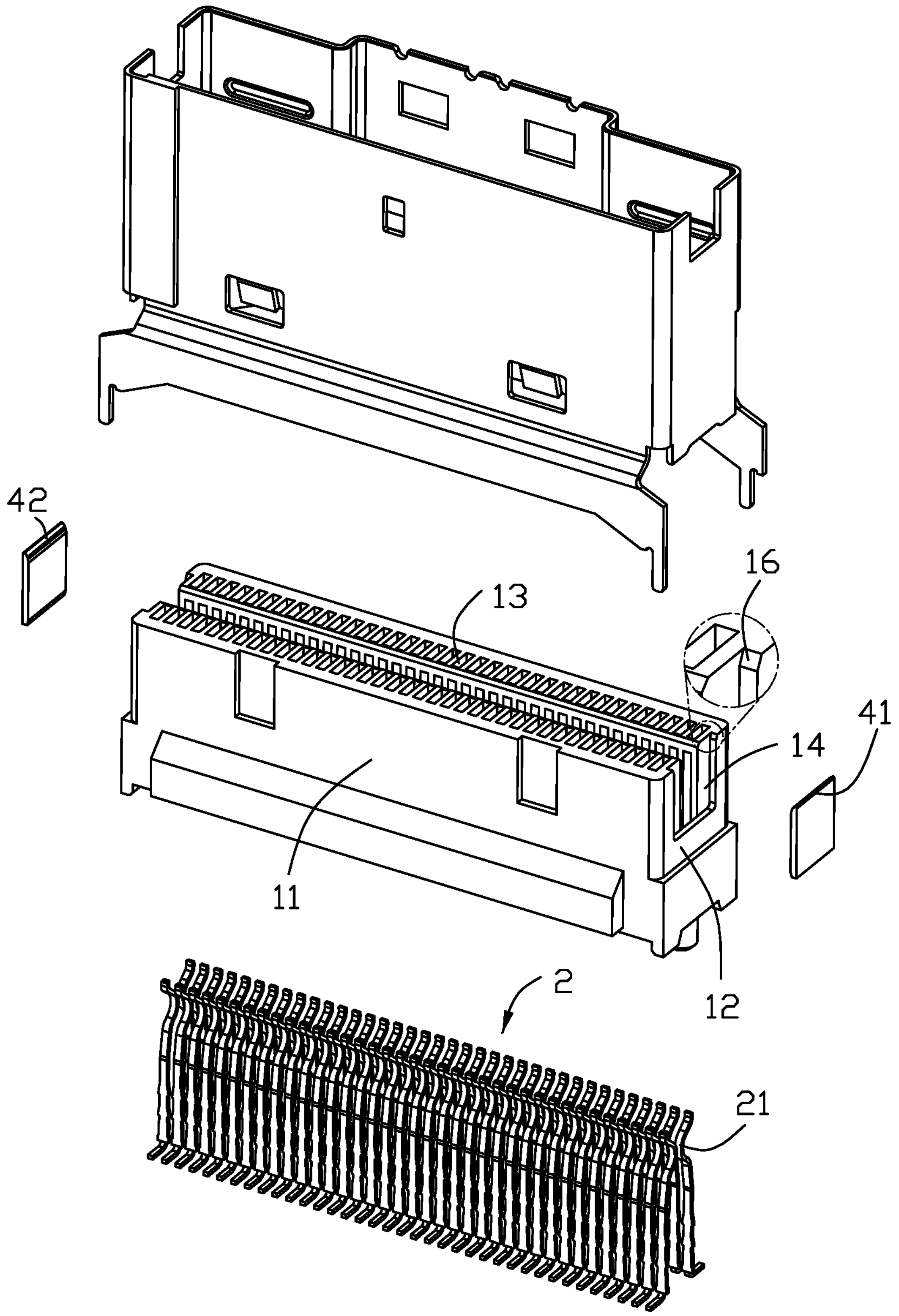
FIG. 4 is a further exploded perspective view of the electrical connector of FIG. 3.
Figure 5:
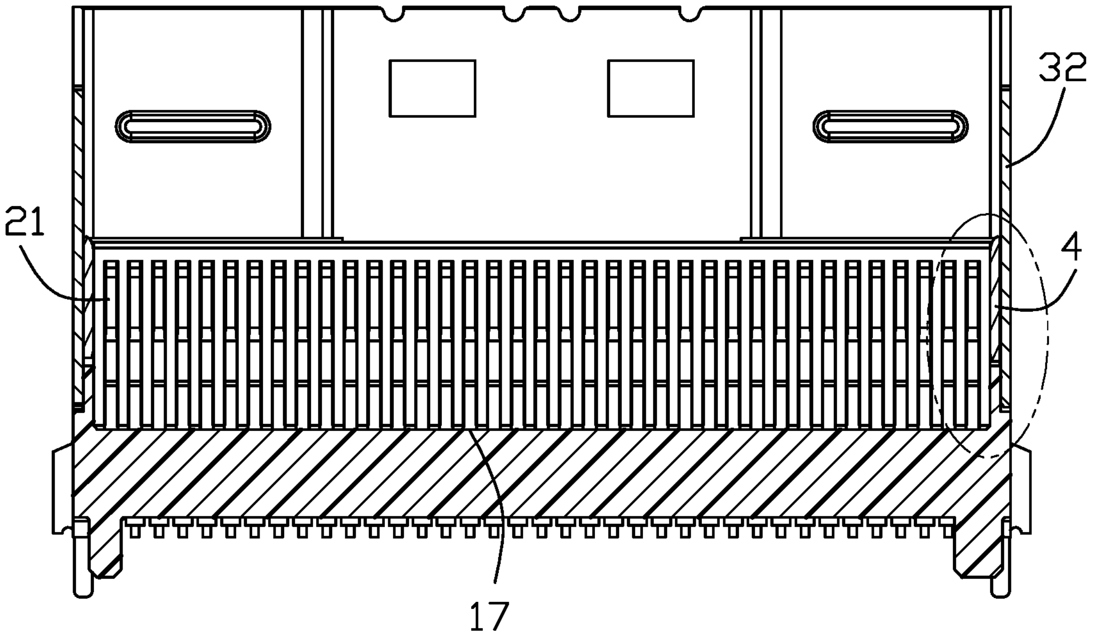
FIG. 5 is a cross-sectional view of the electrical connector of FIG. 1 taken along lines 5-5.
Figure 6:
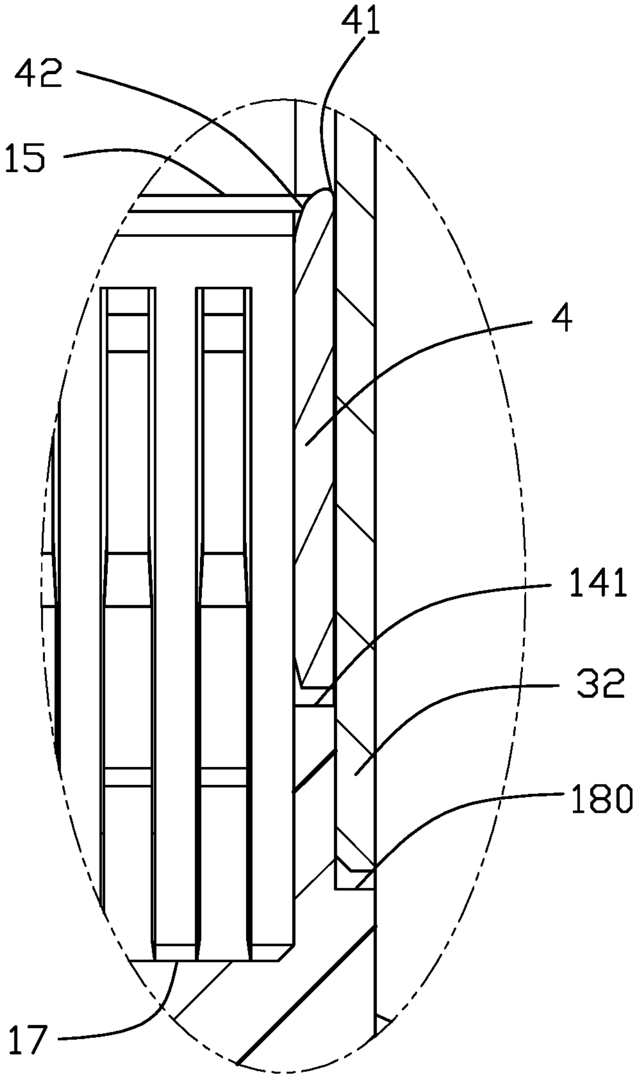
FIG. 6 is an enlarged view of a circled portion in FIG. 5.

The reinforcing member 4 is a metal member and, in this embodiment, may be made of stainless steel. The reinforcing member 4 and the corresponding end plate 32 are fixed together by welding. A welding connection can improve a bonding strength between the end plate 32 and the reinforcing member 4 and overcome a disadvantage of easily falling off of the reinforcing member 4, so as to provide a better protection for the insulative housing 1. In other embodiments, the reinforcing member 4 can be made of other stiff materials. The end plate 32 and the reinforcing member 4 can be fixed together by other means, such as bonding with an adhesive or riveting. As shown in FIGS. 3-4, the insulative housing 1 defines a mating face 15. The mating slot 14 is recessed from the mating face 15. A top of the reinforcing member 4 is higher than the mating face 15 as shown in FIG. 6. Referring to FIGS. 4 and 6, a top edge 41 of the reinforcing member 4 comprises an inside guide face 42 facing the mating slot 13 and extending obliquely downward. Two transverse sides of the recess 14 define inclined faces 16 for guiding the reinforcing members 4. The inclined faces 16 extend obliquely downward away from the mating face 15. When oblique insertion or mis-insertion of the mating connector happens, the reinforcing member 4 is prevented from being damaged.

Referring to FIGS. 3 and 6, the recess 14 exceeds the mating slot 13 in the transverse direction. The reinforcing member 4 also exceeds the mating slot 13 in the transverse direction. Viewed from the longitudinal direction as shown in FIG. 4, the recesses 14 overlap the side walls 11. The reinforcing members 4 at least overlap the side walls 11 in the transverse direction. The end wall 12 defines a convex part 18 protruding outward in the longitudinal direction. The convex part 18 defines a first resisting face 180 at an upper face thereof. The end plate 32 seats on the first resisting face 180. The recess 14 defines a second resisting face 141. The reinforcing member 4 seats on the second resisting face 141.

The second resisting face 141 is higher than the first resisting face 180, alternatively flush with the second resisting face 141. The second resisting face 141 is closer to the mating face 15 than the first resisting face 180. In this way, the end plate 32 can better protect the corresponding reinforcing member 4. The mating slot 13 defines a bottom face 17. The bottom face 17 is lower than the first resisting face 180.

In this embodiment, the metallic shell 3 is sleeved on the insulative housing 1 from top to bottom. In order to prevent the metallic shell 3 from being separated from the insulative housing 1, the side wall 11 of the insulative housing 1 has protruding rib 110. The side plate 31 comprises a side protrusion 310 abutting against the protruding rib 110 downward and covering the protruding rib 110. In addition, the side plate 31 defines buckling tabs 33 formed by tearing from the metallic shell 3. The side wall 11 of the insulative housing 1 defines buckling holes 19 locked with the corresponding buckling tabs 33.

In this embodiment, the reinforcing member 4 is fixed with the metallic shell 3 firstly, and then the metallic shell 3 with the reinforcing member 4 is assembled to the insulative housing 1. In other embodiments, the reinforcing member 4 is installed into the recess 14 firstly, then the metallic shell 3 is assembled to the insulative housing 1, and a weld, bonding or riveting process is applied on the metallic shell 3 and the reinforcing member 4.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:
- an insulative housing comprising two side walls extending along a longitudinal direction thereof and two end walls connecting with the two side walls to together define a mating slot;
- a plurality of conductive terminals arranged on the side walls and comprising contacting portions protruding into the mating slot;
- a metallic shell surrounding the insulative housing and comprising two side plates covering the side walls and two end plates covering the end walls; and
- a pair of reinforcing members retained in the end walls, respectively;
- wherein the end wall defines a recess accommodating the reinforcing member, an inside of the reinforcing member directly faces the mating slot, and an outside of the reinforcing member is attached with the end plate;
- wherein the end wall defines a first resisting face, the end plate seats on the first resisting face, the recess defines a second resisting face, the reinforcing member seats on the second resisting face, and the second resisting face is disposed higher than the first resisting face; and
- wherein the mating slot defines a bottom face, and the bottom face is disposed lower than the first resisting face.

2. The electrical connector as claimed in claim 1, wherein the reinforcing member and the end plate are fixed together by welding.

3. The electrical connector as claimed in claim 1, wherein the insulative housing defines a mating face from which the mating slot is recessed, and a top edge of the reinforcing member is higher than the mating face.

4. The electrical connector as claimed in claim 3, wherein the top edge of the reinforcing member defines a guide face facing the mating slot and extending obliquely downward.

5. The electrical connector as claimed in claim 4, wherein the recess defines inclined faces extending obliquely downward away from the mating face.

6. The electrical connector as claimed in claim 1, wherein the recess extends in an upper-lower direction and a transverse direction perpendicular to the longitudinal direction, and the recess exceeds the mating slot in the transverse direction.

7. The electrical connector as claimed in claim 1, wherein the metallic shell defines buckling tabs, and the insulative housing defines buckling holes to be locked with the buckling tabs.

8. The electrical connector as claimed in claim 1, wherein the reinforcing member is made of stainless steel.

9. An electrical connector comprising:
- an insulative housing defining a mating face and a longitudinal mating slot recessed from the mating face;
- a plurality of conductive terminals arranged on the insulative housing and comprising contacting portions extending into the mating slot;
- a metallic shell surrounding the insulative housing; and
- a pair of reinforcing members located at two opposite ends of the mating slot in a longitudinal direction;
- wherein each of the reinforcing members directly borders the mating slot and is directly attached with an inside of the metallic shell;
- wherein a top edge of the reinforcing member is higher than the mating face;
- wherein the reinforcing members exceed the mating slot in a transverse direction perpendicular to the longitudinal direction; and
- wherein the reinforcing member overlaps the side walls in the transverse direction.

10. The electrical connector as claimed in claim 9, wherein the top edge of the reinforcing member defines a guide face facing the mating slot and extending obliquely downward.

11. The electrical connector as claimed in claim 9, wherein the reinforcing member and the end plate are fixed together by welding.

12. An electrical connector comprising:
- an insulative housing comprising two side walls extending along a longitudinal direction thereof and two end walls connecting with the two side walls to together define a mating slot;
- a plurality of conductive terminals arranged on the side walls and comprising contacting portions protruding into the mating slot;
- a metallic shell surrounding the insulative housing and comprising two side plates covering the side walls and two end plates covering the end walls; and
- a pair of reinforcing members retained in the end walls, respectively;
- wherein the end wall defines a recess accommodating the reinforcing member, an inside of the reinforcing member directly faces the mating slot, and an outside of the reinforcing member is attached with the end plate;
- wherein the insulative housing defines a mating face from which the mating slot is recessed, and a top edge of the reinforcing member is higher than the mating face;
- wherein the top edge of the reinforcing member defines a guide face facing the mating slot and extending obliquely downward; and wherein the recess defines inclined faces extending obliquely downward away from the mating face.

* * * * *